United States Patent
Kim et al.

(10) Patent No.: US 10,021,317 B2
(45) Date of Patent: Jul. 10, 2018

(54) IMAGE DISPLAY APPARATUS CAPABLE OF REGULATING FOCUSING USING A CAMERA MODULE HAVING A SINGLE LENS AND METHOD OF OPERATING THE SAME

(71) Applicant: LG ELECTRONICS INC., Seoul (KR)

(72) Inventors: Sun Ryang Kim, Seoul (KR); Sang Won Um, Seoul (KR); Il Yong Lee, Seoul (KR); Sung Hyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/031,401

(22) PCT Filed: Oct. 25, 2013

(86) PCT No.: PCT/KR2013/009608
§ 371 (c)(1),
(2) Date: Apr. 22, 2016

(87) PCT Pub. No.: WO2015/060485
PCT Pub. Date: Apr. 30, 2015

(65) Prior Publication Data
US 2016/0277659 A1 Sep. 22, 2016

(51) Int. Cl.
H04N 5/222 (2006.01)
H04N 5/235 (2006.01)
(Continued)

(52) U.S. Cl.
CPC ........ *H04N 5/2356* (2013.01); *H04N 1/2125* (2013.01); *H04N 1/32128* (2013.01); *H04N 5/2257* (2013.01); *H04N 5/23212* (2013.01); *H04N 5/23293* (2013.01); *H04N 5/772* (2013.01)

(58) Field of Classification Search
None
See application file for complete search history.

(56) References Cited

U.S. PATENT DOCUMENTS 6,018,631 A 1/2000 Taniguchi et al.
6,930,839 B2 8/2005 Hagimori et al.
(Continued)

FOREIGN PATENT DOCUMENTS

JP 2013-88579 A 5/2013
KR 10-126101 B1 5/2013

*Primary Examiner* — Stephen Coleman
(74) *Attorney, Agent, or Firm* — Birch, Stewart, Kolasch & Birch, LLP

(57) ABSTRACT

Disclosed are an image display apparatus and a method of operating the same. The method of operating the image display apparatus includes entering a camera mode, acquiring a captured image on a per lens position basis via position shift of a single lens included in a camera module according to the camera mode, storing the acquired captured image on a per lens position basis, displaying at least one of a plurality of stored captured images according to an image view mode, and displaying any one image focused on at least one area in the displayed captured image when the at least one area is selected. This method may enhance user convenience.

15 Claims, 16 Drawing Sheets

(51) Int. Cl.
*H04N 5/232* (2006.01)
*H04N 1/21* (2006.01)
*H04N 1/32* (2006.01)
*H04N 5/225* (2006.01)
*H04N 5/77* (2006.01)

(56) References Cited

U.S. PATENT DOCUMENTS

| | | | |
|---|---|---|---|
| 7,027,084 B1* | 4/2006 | Watanabe | H04N 1/00307 |
| | | | 348/14.1 |
| 7,161,741 B1 | 1/2007 | Schaack | |
| 7,813,526 B1* | 10/2010 | Bourdev | G06F 17/30247 |
| | | | 382/103 |
| 2001/0000126 A1* | 4/2001 | Kinjo | H04N 1/00249 |
| | | | 348/218.1 |
| 2009/0122159 A1* | 5/2009 | Sakaue | H04N 5/23293 |
| | | | 348/231.99 |

* cited by examiner

[Fig. 1]
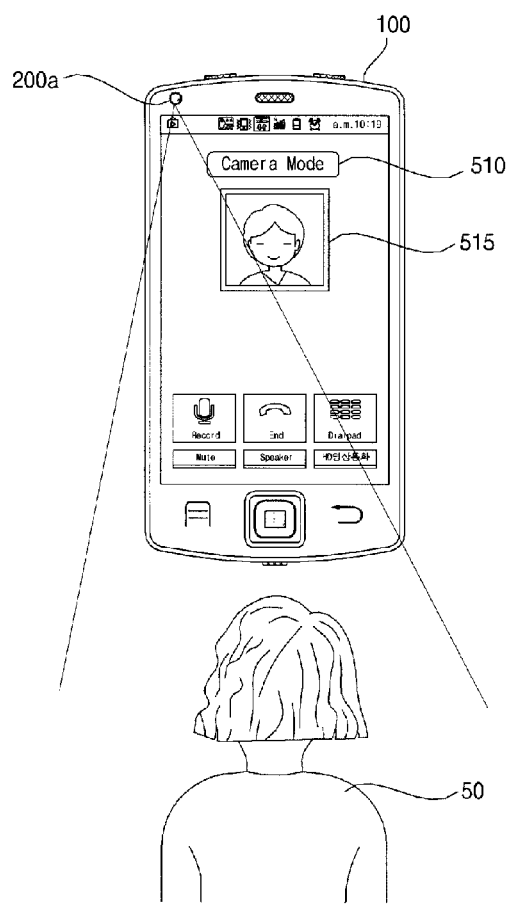
[Fig. 2a]
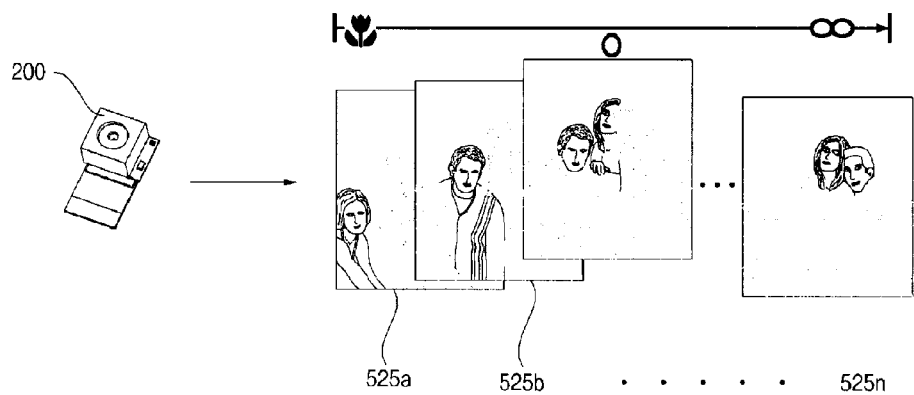

[Fig. 2b]
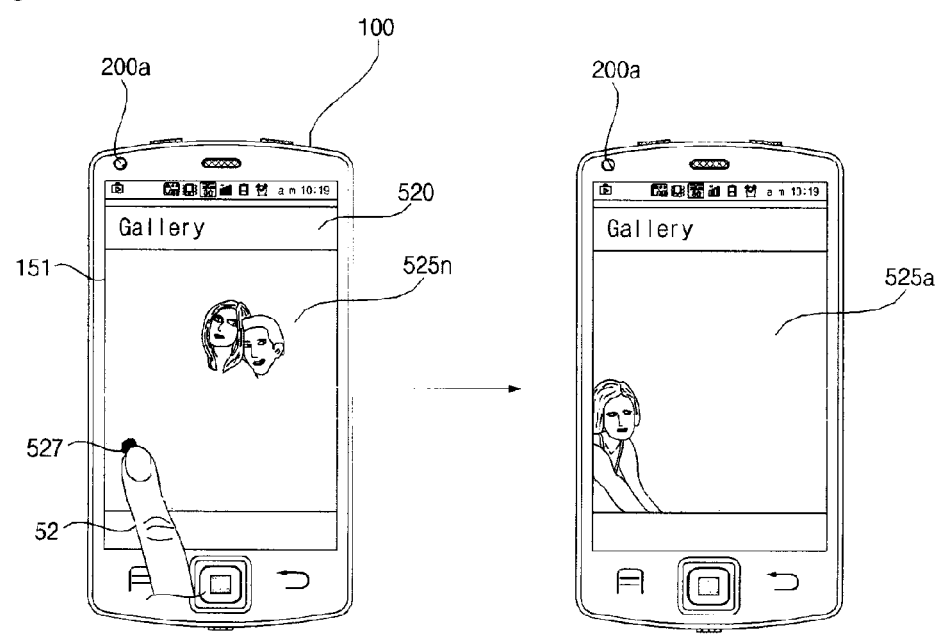

[Fig. 3]
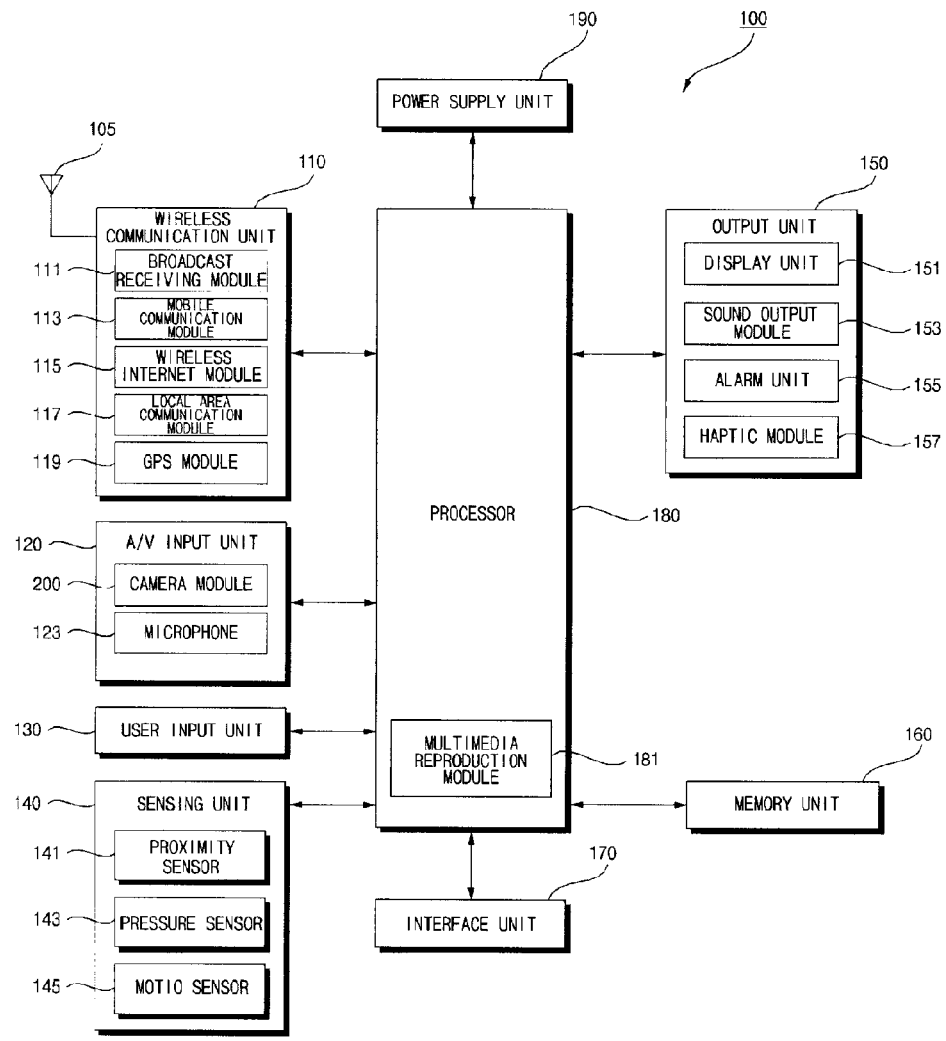

[Fig. 4]
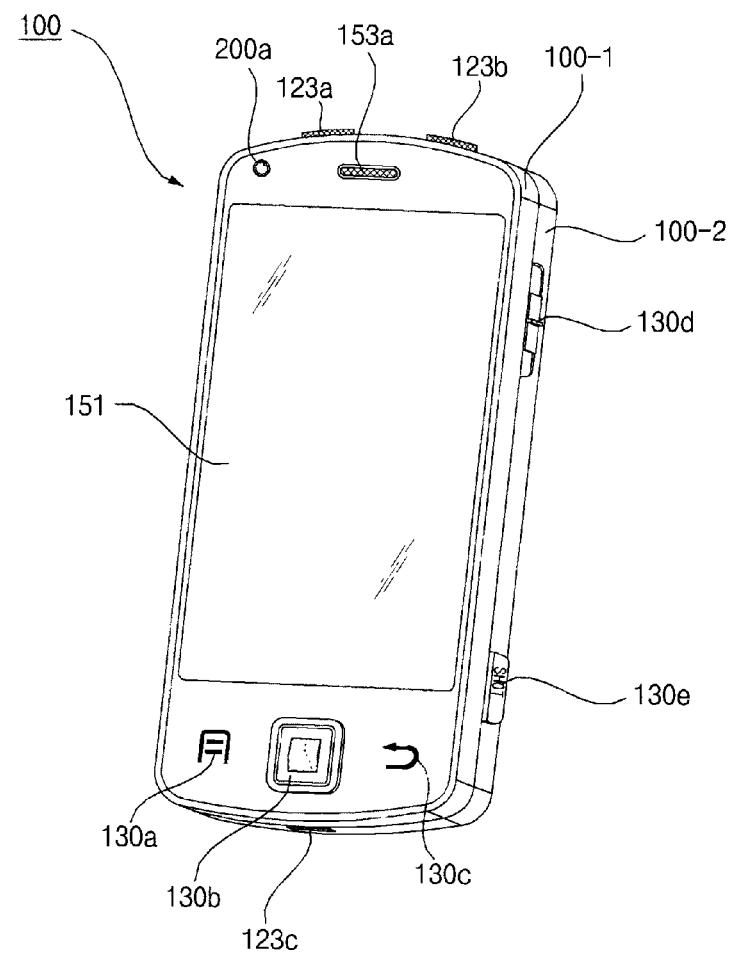

[Fig. 5]
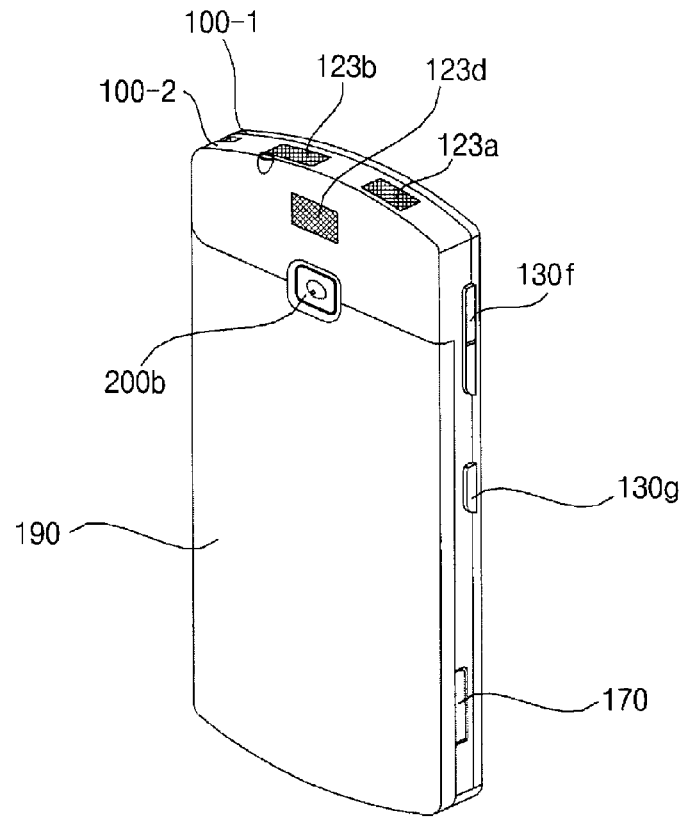
[Fig. 6]
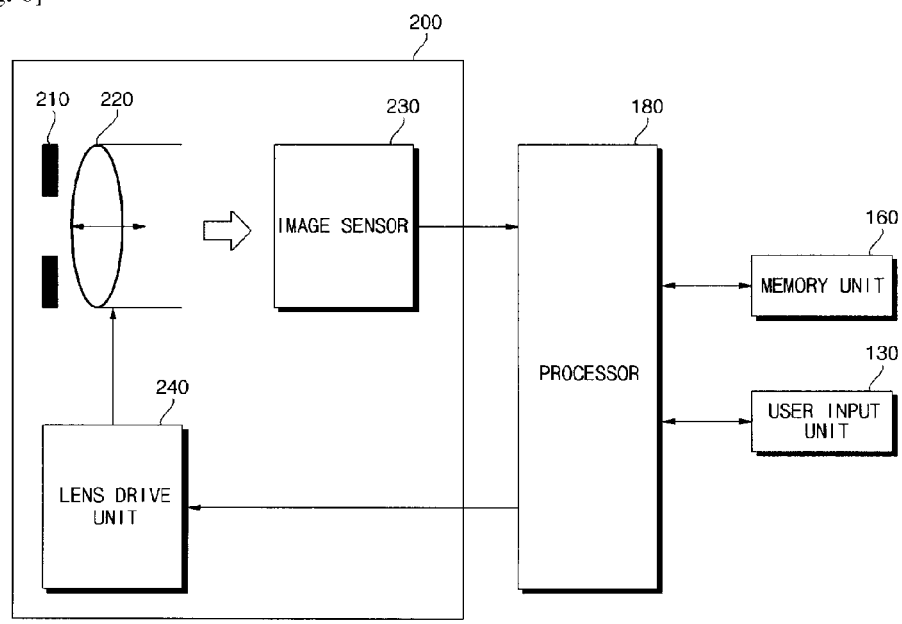

[Fig. 7]
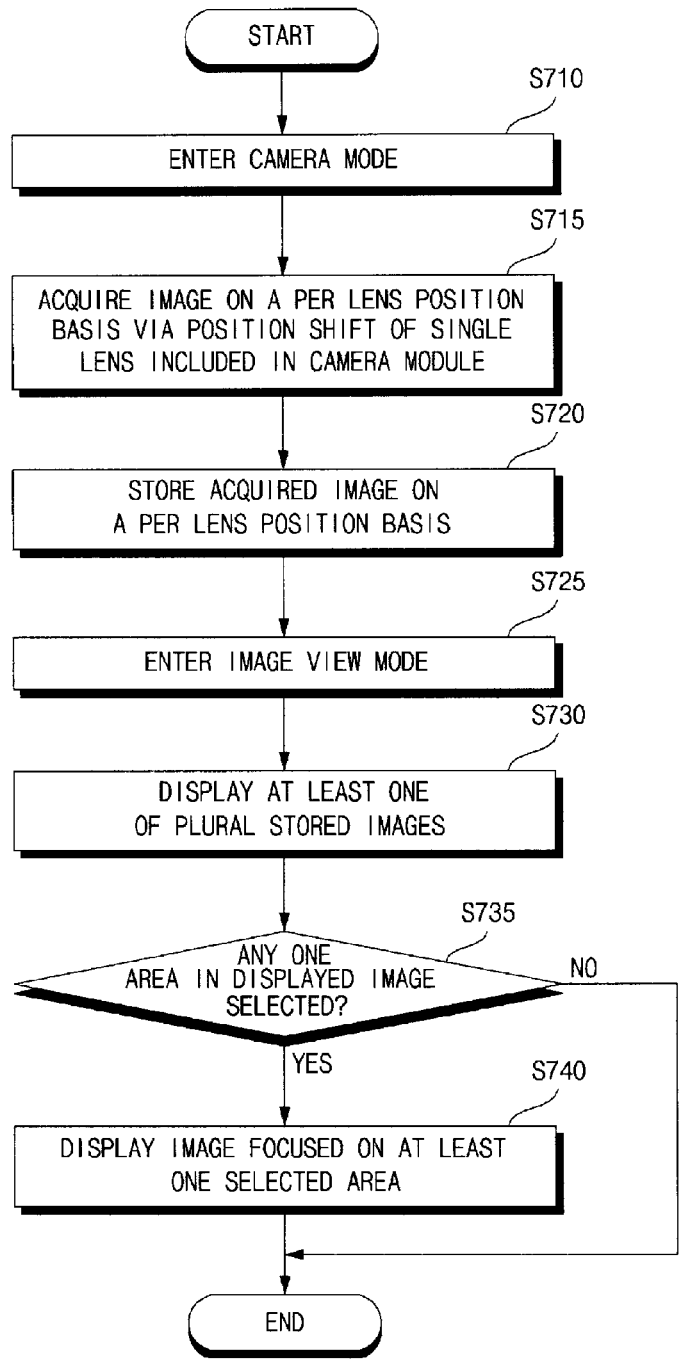

[Fig. 8]
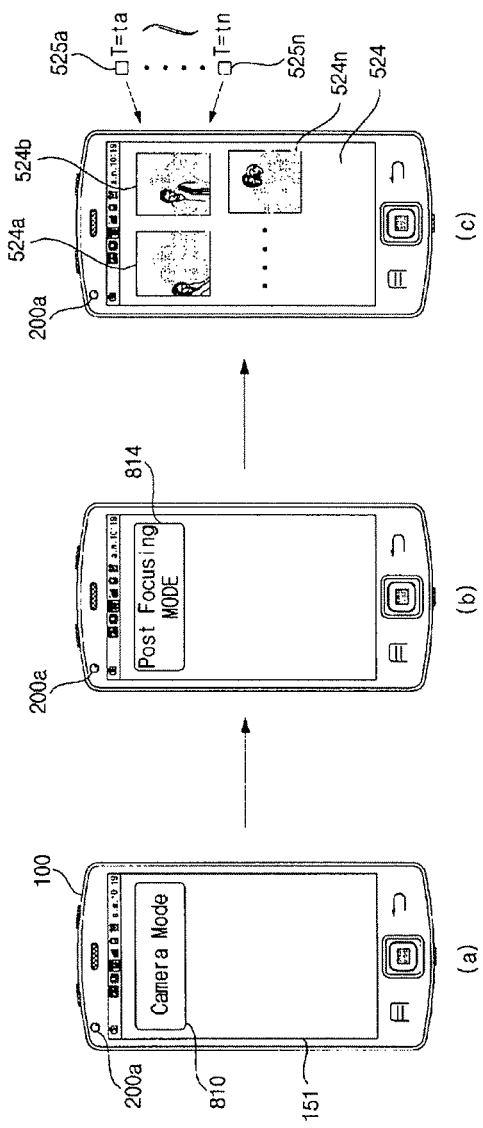

[Fig. 9]
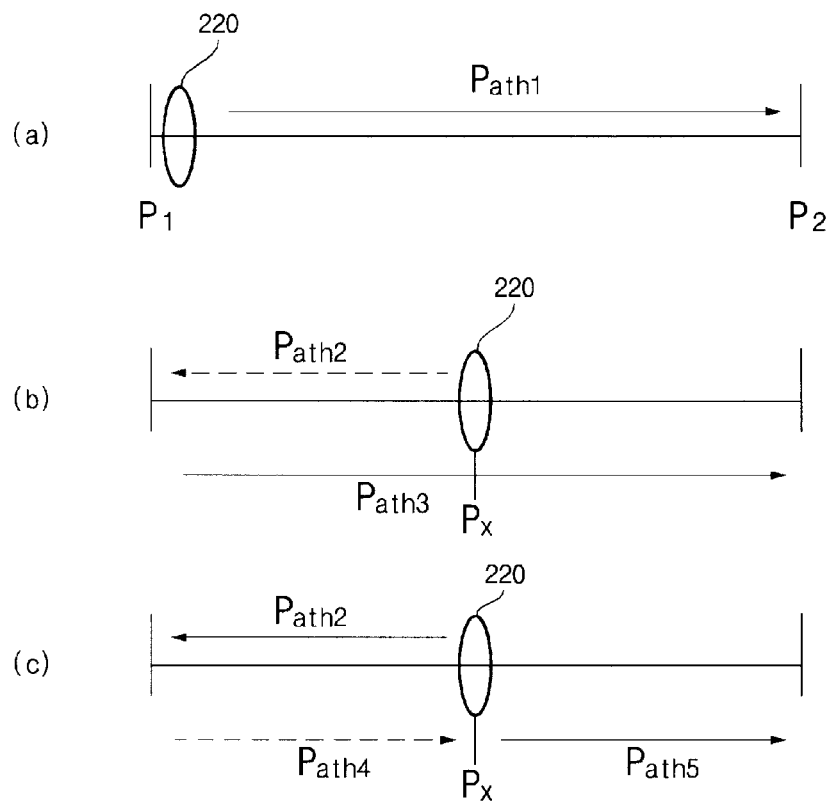

[Fig. 10]
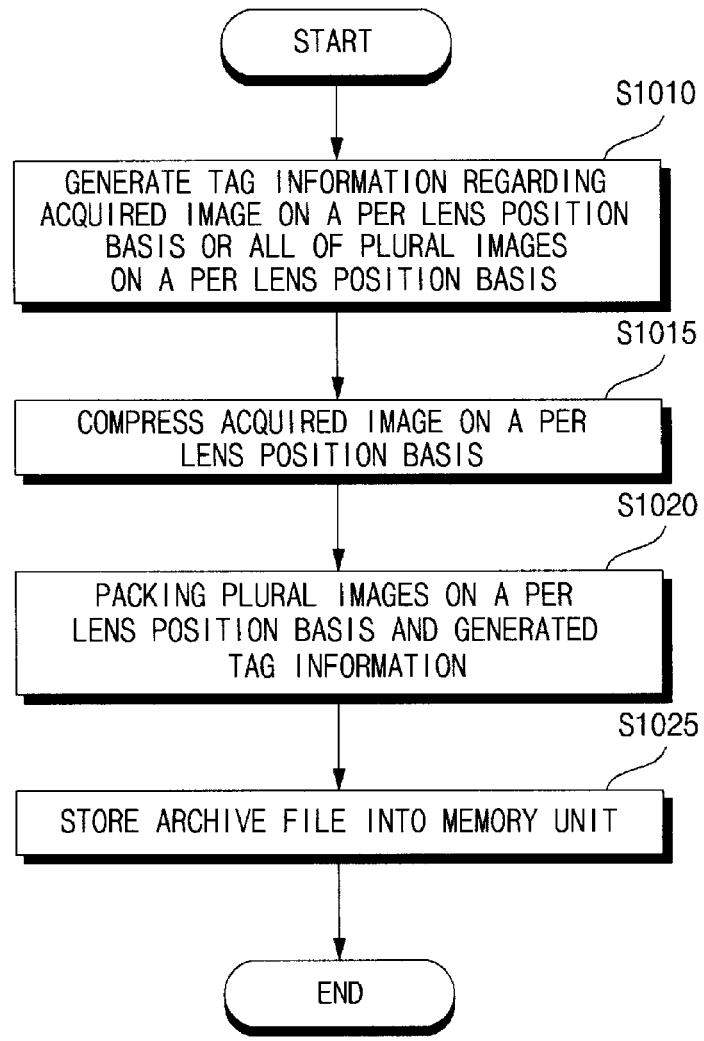

[Fig. 11]
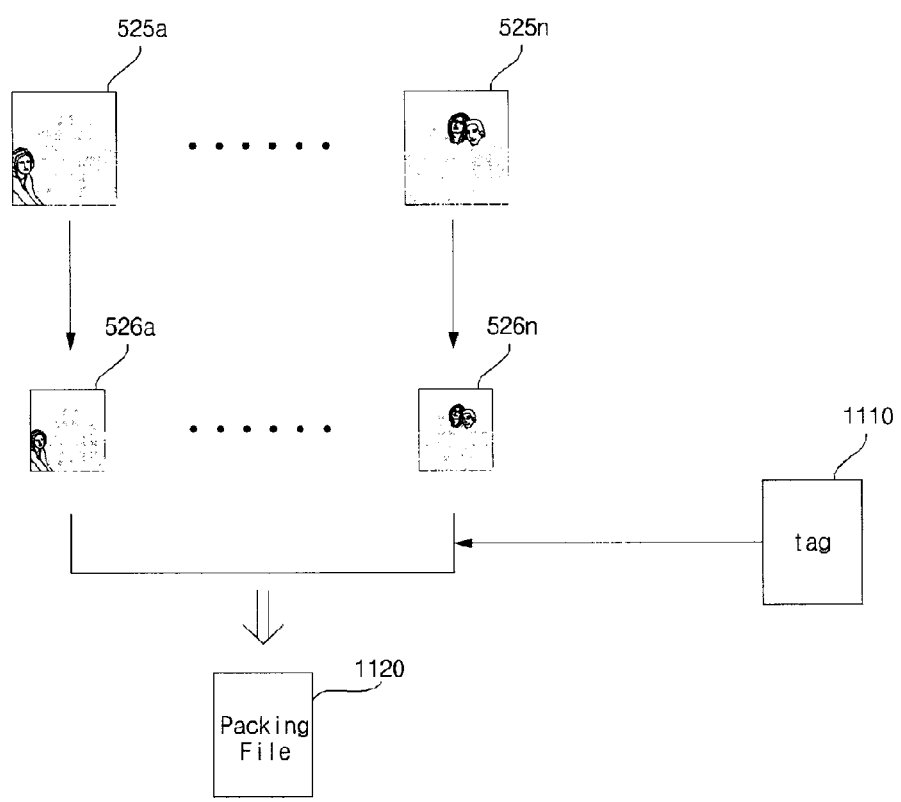

[Fig. 12]
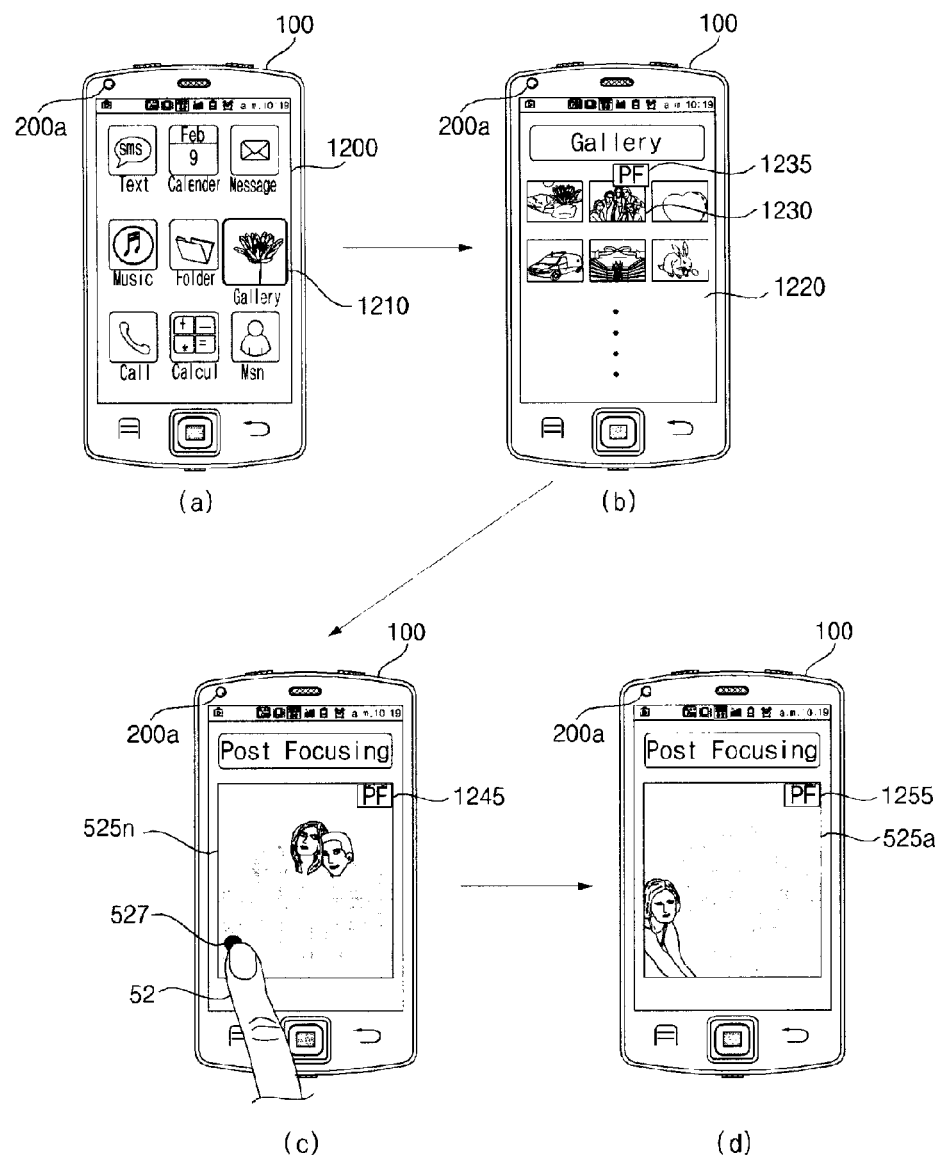

[Fig. 13]
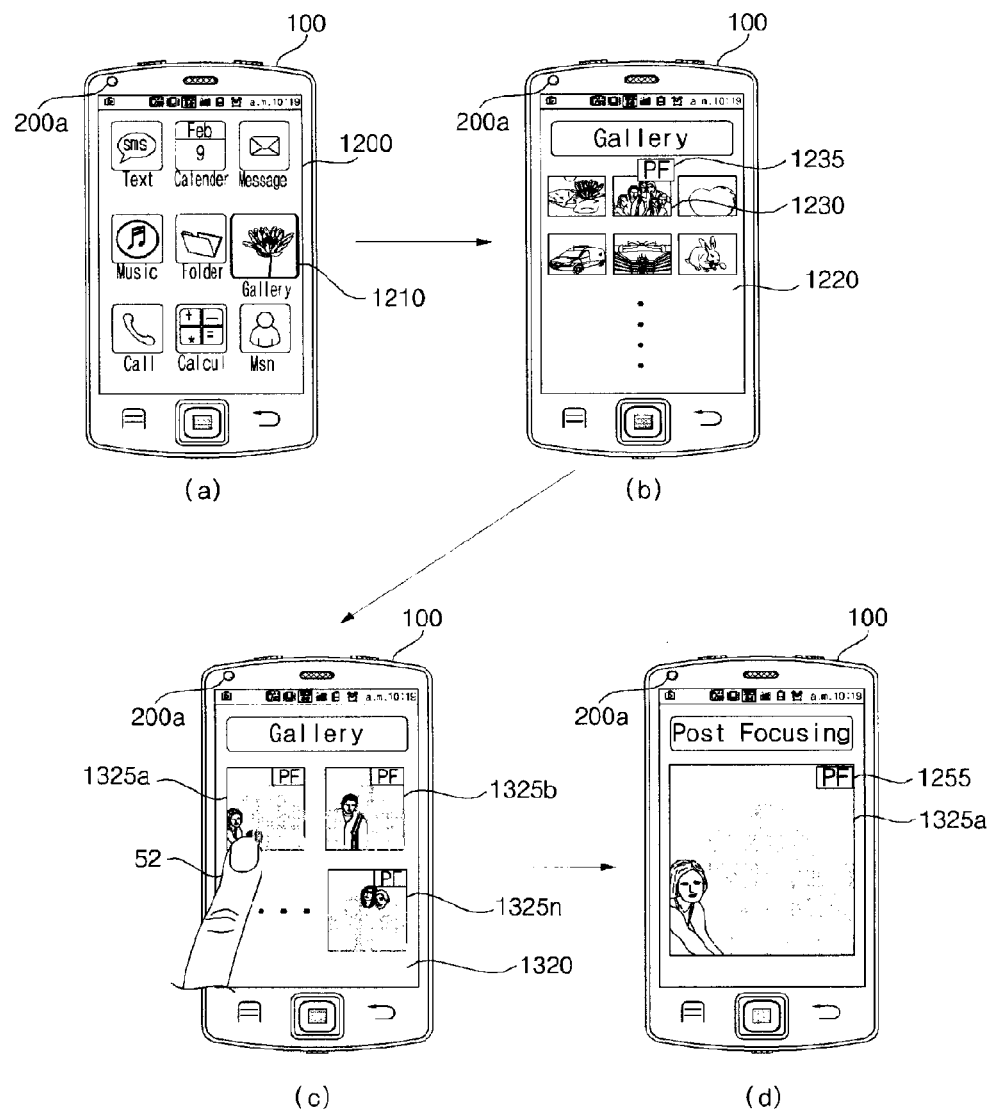

[Fig. 14]
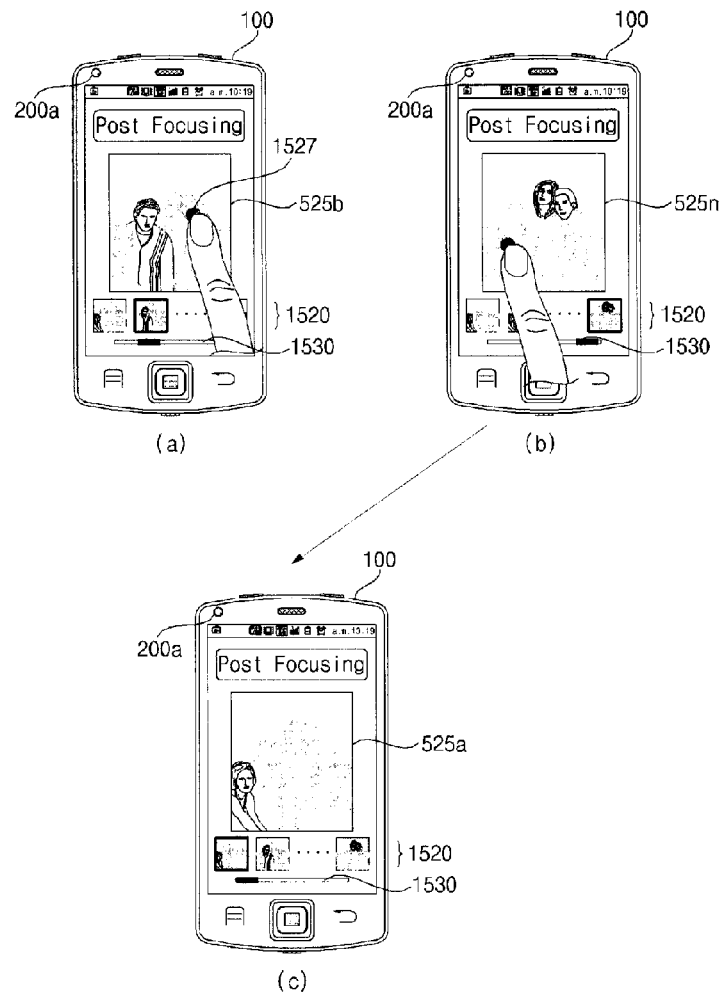
[Fig. 15]
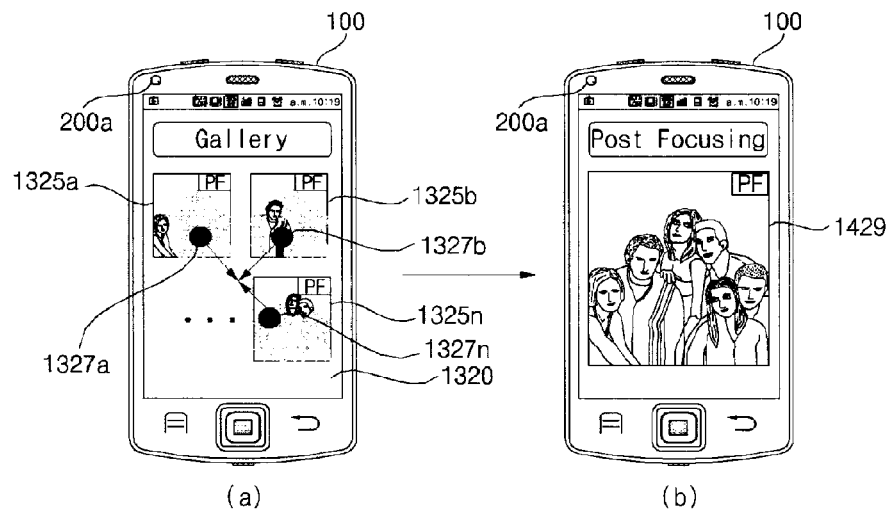

[Fig. 16]
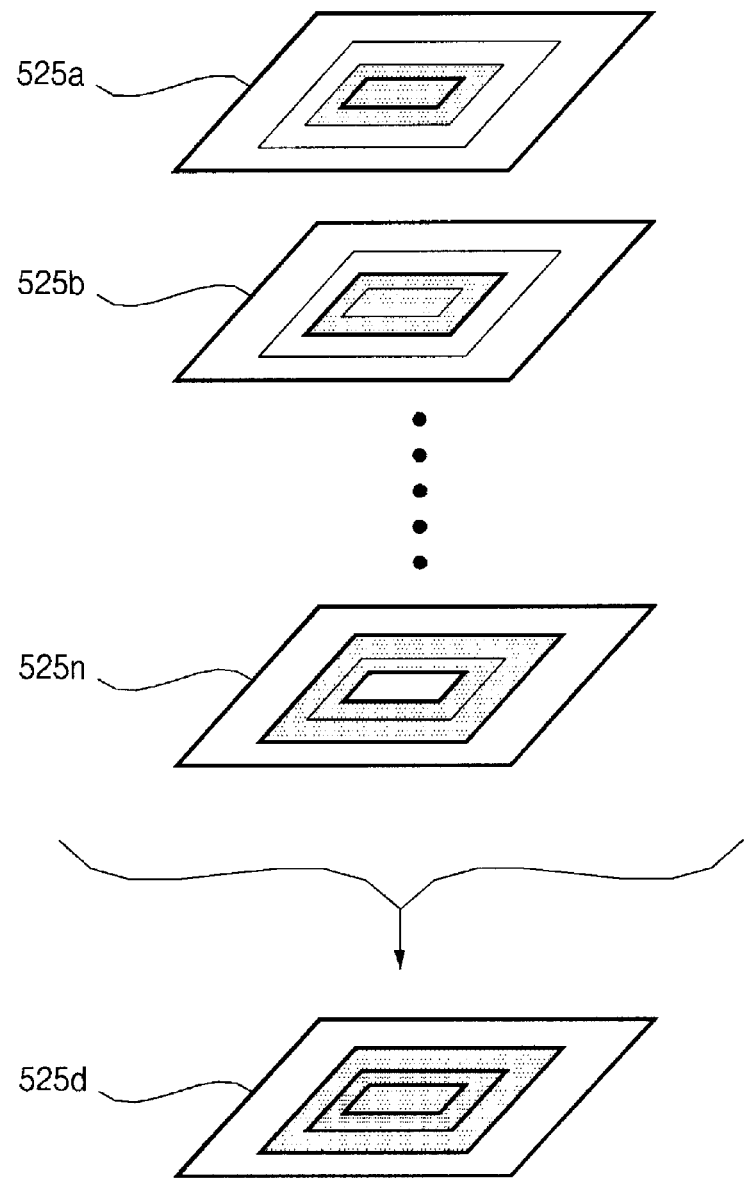

[Fig. 17]
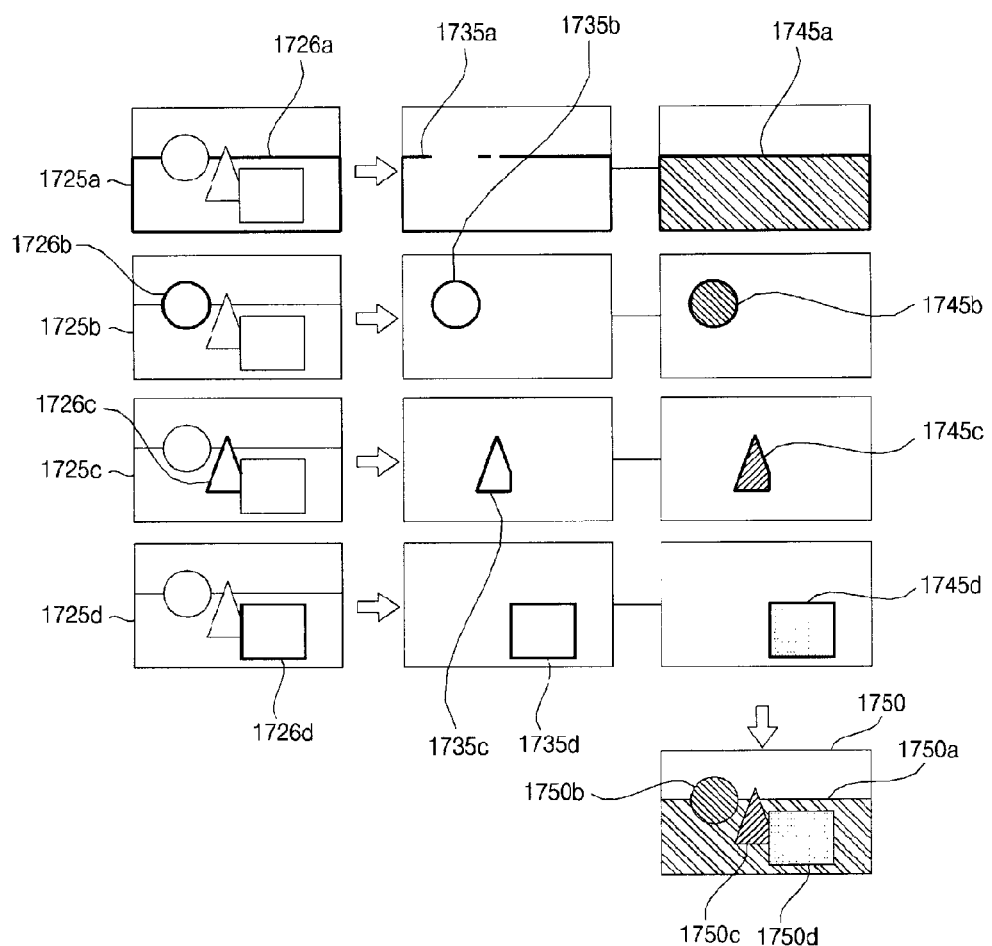

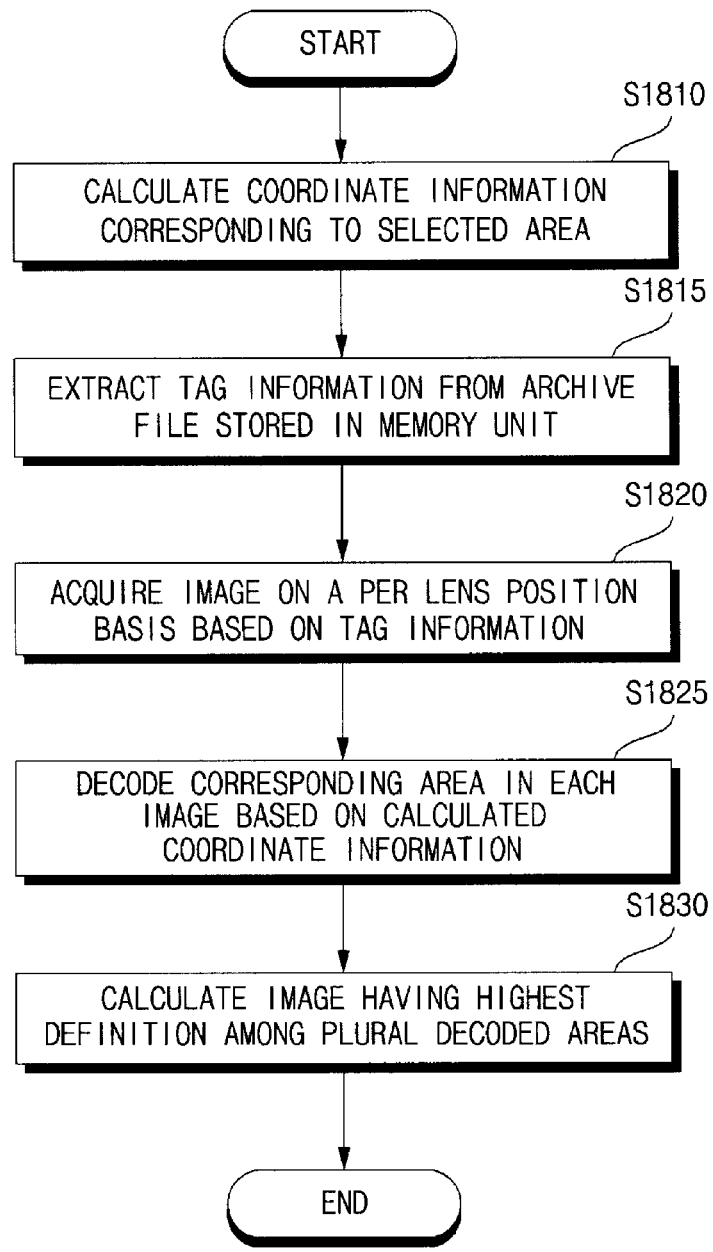
[Fig. 18]

IMAGE DISPLAY APPARATUS CAPABLE OF REGULATING FOCUSING USING A CAMERA MODULE HAVING A SINGLE LENS AND METHOD OF OPERATING THE SAME

TECHNICAL FIELD

The present invention relates to an image display apparatus and a method of operating the same, and more particularly to an image display apparatus, which may regulate focusing using a camera module having a single lens, and a method of operating the image display apparatus.

BACKGROUND ART

Cameras, which acquire certain images, i.e. videos and still images by photographing subjects, are gradually reducing in size, and are increasingly included in image display apparatuses, such as mobile terminals, PDAs, laptop computers, and the like.

Researches for methods to acquire and restore high quality images while achieving reduction in the size and thickness of a camera have become active.

SUMMARY OF THE INVENTION

It is one object of the present invention to provide an image display apparatus, which may enhance user convenience, and a method of operating the same.

It is another object of the present invention to provide an image display apparatus, which may regulate focusing using a camera module having a single lens, and a method of operating the same.

In accordance with one aspect of the present invention, the above and other objects can be accomplished by the provision of a method of operating an image display apparatus, the method including entering a camera mode, acquiring a captured image on a per lens position basis via position shift of a single lens included in a camera module according to the camera mode, storing the acquired captured image on a per lens position basis, displaying at least one of a plurality of stored captured images according to an image view mode, and displaying any one image focused on at least one area in the displayed captured image when the at least one area is selected.

In accordance with another aspect of the present invention, there is provided an image display apparatus including a camera module including a single lens, an image sensor configured to convert a light signal introduced through the single lens into an electric signal, and a lens movement unit configured to shift a position of the single lens for regulation of a focal distance, a processor configured to acquire a captured image on a per lens position basis via position shift of the single lens included in the camera module according to a camera mode, a memory unit configured to store the acquired captured image on a per lens position basis, and a display unit configured to display at least one of a plurality of stored captured images according to an image view mode and to display any one image focused on the at least one area in the displayed captured image when the at least one area is selected.

BRIEF DESCRIPTION OF DRAWINGS

FIG. 1 is a view illustrating image capture by a mobile terminal as one example of an image display apparatus according to an embodiment of the present invention;

FIG. 2A is a view illustrating acquisition of images depending on movement of a lens included in a camera module of the mobile terminal shown in FIG. 1;

FIG. 2B is a view illustrating focusing movement depending on selection of an area in an image displayed on the mobile terminal shown in FIG. 1;

FIG. 3 is a block diagram of a mobile terminal as one example of an image display apparatus according to an embodiment of the present invention;

FIG. 4 is a perspective view of the mobile terminal shown in FIG. 3 viewed from the front side;

FIG. 5 is a rear perspective view of the mobile terminal shown in FIG. 4;

FIG. 6 is a block diagram illustrating an internal configuration of a camera module shown in FIG. 3;

FIG. 7 is a flowchart illustrating a method of operating an image display apparatus according to an embodiment of the present invention; and FIGS. 8 to 18 are reference views explaining various examples of a method of operating an image display apparatus of FIG. 7.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

An image display apparatus, as described herein, may be an image display apparatus, which is equipped with a camera module having a single lens, or which enables data exchange with a camera module having a single lens. Thus, such an image display apparatus may function to acquire an image on a per lens position basis via position shift of a single lens, and store the acquired image on a per lens position basis.

The image display apparatus may be a movable display apparatus, such as a mobile terminal, or a stationary display apparatus, such as a TV, monitor, or the like. Examples of the mobile terminal include a cellular phone, a smart-phone, a notebook computer, a digital broadcasting terminal, a Personal Digital Assistant (PDA), a Portable Multimedia Player (PMP), a camera, a navigation system, a tablet computer, and an e-book terminal.

The following description will focus upon on a mobile terminal as one example of an image display apparatus.

With respect to constituent elements used in the following description, suffixes "module" and "unit" are given only in consideration of ease in the preparation of the specification, and do not have or serve as specially important meanings or roles. Thus, the "module" and "unit" may be mingled with each other.

FIG. 1 is a view illustrating image capture by a mobile terminal as one example of an image display apparatus according to an embodiment of the present invention.

Referring to FIG. 1, the mobile terminal 100 may capture an image via a camera module 200 when entering a camera mode.

The drawing illustrates the case in which a first camera module 200a captures an image containing a user 50 and a captured image 515 is displayed in a camera mode screen 510.

In addition, an optional second camera module 200b may be provided to capture an image in a rearward direction of the mobile terminal 100.

As described in the present invention, in the case in which each of the first camera module 200a and the second camera module 200b includes a single lens, differently from a multi-camera method or a multi-lens method according to the related art, acquisition of a focused image among captured images is not easy.

First, in the multi-camera method of the related art, if several cameras respectively capture images of the same area and a focusing position is selected, an optimal focused image corresponding to the selected position is selected from among the images captured by the respective cameras.

Next, in the multi-lens method of the related art, if several lenses respectively capture images of partial areas of a certain area and a focusing position is selected, an optimal focused image corresponding to the selected position is selected from among the images captured by the respective lenses.

On the other hand, in the case of the camera module 200 of the present invention having a single lens, preferably, a plurality of images is sequentially acquired as the single lens is shifted in position, in order to acquire an optimal focused image corresponding to a selected focusing position.

FIG. 2A is a view illustrating acquisition of images depending on movement of the lens included in the camera module of the mobile terminal shown in FIG. 1.

Referring to FIG. 2A, the camera module 200 of the mobile terminal 100 may sequentially move a lens (220 of FIG. 9) from a first end to a second end. Macro shooting to focus upon a short distance is possible at a lens position corresponding to the first end, and shooting to focus upon a long distance is possible at a lens position corresponding to the second end. In this case, it is assumed that an aperture to open the lens (220 of FIG. 9) is fixed at a constant size.

The mobile terminal 100 may sequentially acquire a first captured image 525a and a second captured image 525b via short distance focusing, as well as an nth captured image 525n via long distance focusing as the lens (220 of FIG. 9) is moved from the first end to the second end.

Referring to FIG. 2A, it will be appreciated that a focusing distance increases from the first captured image 525a to the nth captured image 525n.

These captured images 525a, . . . , 525n may be stored in a memory unit (160 of FIG. 3).

FIG. 2B is a view illustrating focusing movement depending on selection of an area in an image displayed on the mobile terminal shown in FIG. 1.

Referring to FIG. 2B, in a state in which the nth captured image 525n, acquired via long distance focusing, is displayed on a display unit 151 of the mobile terminal 100, if a specific position or area in the nth captured image 525n is selected, the captured image 525a, focused on the selected position or area, may be displayed at the corresponding position or area.

More specifically, FIG. 2B illustrates selection of an area 527 corresponding to a short distance via touch input by a user finger 52. In this case, a processor 180 of the mobile terminal 100 may select the first captured image 525a, focused on the corresponding region 527, from among the images 525a, . . . , 525n captured respectively at a plurality of lens positions that are stored in the memory unit 160, and then control display of the first captured image 525a on the display unit 151.

Such a procedure of selecting a specific area by a user and thereafter acquiring an image of the selected area may be referred to as a post focusing mode.

The post focusing mode may be manually selected and executed during execution of an image view mode via the mobile terminal 100. Alternatively, in a state in which an image view mode is executed to display a plurality of images, if any one image, to which the post focusing mode is applicable, is selected from among the plurality of images, the post focusing mode may be automatically executed. The post focusing mode will be described below in greater detail with reference to FIG. 6 as well as the following drawings.

FIG. 3 is a block diagram of the mobile terminal as one example of the image display apparatus according to an embodiment of the present invention. Hereinafter, the mobile terminal according to the embodiment of the present invention will be described in terms of functional components with reference to FIG. 3.

Referring to FIG. 3, the mobile terminal 100 may include a wireless communication unit 110, an Audio/Video (A/V) input unit 120, a user input unit 130, a sensing unit 140, an output unit 150, a memory unit 160, an interface unit 170, a processor 180, and a power supply unit 190. When realized in practical implementations, as necessary, two or more components among the aforementioned components may be combined into a single component, or any one component may be divided into two or more components.

The wireless communication unit 110 may include a broadcast receiving module 111, a mobile communication module 113, a wireless Internet module 115, a local area communication module 117, and a Global Positioning System (GPS) module 119, for example.

The broadcast receiving module 111 is adapted to receive at least one of broadcast signals and broadcast related information from an external broadcasting management server through broadcast channels. In this case, the broadcast channels may include a satellite channel, a terrestrial channel, and the like. The broadcasting management server may refer to a server that generates and transmits at least one of broadcast signals and broadcast related information, or a server that receives at least one of previously generated broadcast signals and broadcast related information and transmits the same to terminals.

The broadcast signals may include TV broadcast signals, radio broadcast signals, data broadcast signals, as well as combinations of TV broadcast signals or radio broadcast signals and data broadcast signals. The broadcast related information may refer to information related to broadcast channels, broadcast programs, or broadcasting service providers. The broadcast related information may be provided through a mobile communication network. In this case, the broadcast related information may be received by the mobile communication module 113. Various types of broadcast related information are available.

The broadcast receiving module 111 may receive broadcast signals using various broadcasting systems. In particular, the broadcast receiving module 111 may receive digital broadcast signals using digital broadcasting systems, such as Digital Multimedia Broadcasting-Terrestrial (DMB-T), Digital Multimedia Broadcasting-Satellite (DMB-S), Media Forward Link Only (MediaFLO), Digital Video Broadcasting-Handheld (DVB-H), Integrated Service Digital Broadcasting-Terrestrial (ISDB-T), and the like. In addition, the broadcast receiving module 111 may be configured to conform to the aforementioned digital broadcasting systems as well as all other broadcasting systems that provide broadcast signals. The broadcast signals and/or the broadcast related information received by the broadcast receiving module 111 may be stored in the memory unit 160.

The mobile communication module 113 is adapted to transmit and receive wireless signals to and from at least one of a base station, an external terminal, and a server on a mobile communication network. Here, the wireless signals may include various types of data depending on transmission and reception of voice call signals, video call signals, or text/multimedia messages.

The wireless Internet module 115 is a module for wireless Internet access. The wireless Internet Module 115 may be embedded within the mobile terminal 100, or may be externally mounted to the mobile terminal 100. Wireless Internet technologies may include Wireless LAN (WLAN) (Wi-Fi), Wireless Broadband (WiBro), World Interoperability for Microwave Access (WiMAX), High Speed Downlink Packet Access (HSDPA), and the like.

The local area communication module 117 is a module for local area communication. Local area communication technologies may include Bluetooth, Radio Frequency Identification (RFID), Infrared Data Association (IrDA), Ultra Wideband (UWB), ZigBee, Near Field Communication (NFC), and the like.

The GPS module 119 is adapted to receive position information from a plurality of GPS satellites.

The A/V input unit 120 is adapted to input audio signals or video signals. The A/V input unit 120 may include the camera module 200 and a microphone 123, for example.

The camera module 200 may process an image frame, such as a still image, a moving image, or the like, acquired via an image sensor in a video call mode or in a camera mode. The processed image frame may be displayed on the display unit 151.

The image frame processed in the camera module 200 may be stored in the memory unit 160, or may be transmitted to an external receiver through the wireless communication unit 110. Two or more camera modules 200 may be provided according to a configuration of the terminal.

More particularly, the camera module 200 according to the embodiment of the present invention may include a single lens, and acquire a captured image on a per lens position basis as the single lens is shifted in position. In particular, in a camera mode, images may be captured on a per lens position basis as the single lens is shifted in position. An interior configuration of the camera module 200 will be described below in greater detail with reference to FIG. 6.

The microphone 123 is adapted to receive audio signals from an external transmitter in an audio reception mode, such as a call mode, a recording mode, a voice recognition mode, or the like, and to process the same into electric voice data. In the call mode, the processed voice data may be converted and output into a form that can be transmitted to a mobile communication base station through the mobile communication module 113. The microphone 123 may utilize a variety of noise removal algorithms to remove noise generated in the process of receiving externally input audio signals.

In an embodiment, a plurality of microphones 123 may be arranged at different positions. Audio signals received by the respective microphones 123 may be processed by the processor 180, for example.

The user input unit 130 is adapted to generate key input data that is input by the user to control operation of the terminal. The user input unit 130 may be configured as a key pad, a dome switch, a touchpad (constant voltage/capacitance), or the like, which may receive instructions or information input by user push or touch manipulation. In addition, the user input unit 130 may be configured as a jog wheel or joystick using rotation of a key, a finger mouse, or the like. In particular, if the touchpad and the display unit 151 that will be described hereinafter have a layered configuration, the resulting structure may be called a touchscreen.

The sensing unit 140 is adapted to sense a current state of the mobile terminal 100, such as an open or closed state of the mobile terminal 100, a position of the mobile terminal 100, the presence of user contact, and the like, and to generate sensing signals for control of operation of the mobile terminal 100. For example, if the mobile terminal 100 is a slide phone type terminal, the sensing unit 140 may sense whether the slide phone is open or closed. In addition, the sensing unit 140 may sense whether or not the power supply unit 190 supplies power, whether or not an external appliance is connected to the interface unit 170, and the like.

The sensing unit 140 may include a proximity sensor 141, a pressure sensor 143, a motion sensor 145, and the like. The proximity sensor 141 may detect, for example, the presence of an object that is approaching the mobile terminal 100 or an object located near the mobile terminal 100 without physical contact. In addition, the proximity sensor 141 may detect, for example, a proximal object using variation of an alternating current magnetic field, variation of a static magnetic field, or a change rate of capacitance. According to a configuration, two or more proximity sensors 141 may be provided.

The pressure sensor 143 may detect whether or not pressure is applied to the mobile terminal 100, and the magnitude of the applied pressure, and the like. The pressure sensor 143 may be installed to a location of the mobile terminal 100 where pressure detection is necessary according to a use environment. If the pressure sensor 143 is installed to the display unit 151, touch input via the display unit 151 and pressure touch input by greater pressure than the touch input may be determined based on a signal output by the pressure sensor 143. In addition, in the case of the pressure touch input, the magnitude of pressure applied to the display unit 151 may be determined based on a signal output by the pressure sensor 143.

The motion sensor 145 may sense a position or motion of the mobile terminal 100, and the like using an accelerometer, a gyro sensor, and the like. The accelerometer, which may be used as the motion sensor 145, is an element that converts variation of acceleration in a given direction into an electric signal, and has widely been used according to development of Micro Electro-Mechanical Systems (MEMS).

There are various kinds of accelerometers including an accelerometer to measure large acceleration values, which is embedded in a vehicular airbag system to sense a crash, as well as an accelerometer to measure small acceleration values, which recognizes slight motion of a user's hand to utilize the same as input means for gaming, and the like. A plurality of accelerometers may typically be mounted on two axes or three axes to constitute a single package. Under a certain use environment, a single axis accelerometer, for example, a Z-axis accelerometer may be necessary. Accordingly, when it is desired to utilize an X-axis or Y-axis accelerometer in place of the Z-axis accelerometer, the accelerometer may be vertically installed on a main board using a separate board segment.

The gyro sensor may be a sensor for measurement of angular velocity, and may sense angular displacement with respect to a reference direction.

The output unit 150 is adapted to output audio signals, video signals, or alarm signals. The output unit 150 may include the display unit 151, a sound output module 153, an alarm unit 155, and a haptic module 157, for example.

The display unit 151 is adapted to display and output information processed in the mobile terminal 100. For example, if the mobile terminal 100 is in a call mode, the display unit 151 displays a User Interface (UI) or Graphical User Interface (GUI) related to a call. If the mobile terminal 100 is in a video call mode or in a camera mode, the display unit 151 may display images captured by or transmitted to the mobile terminal 100 simultaneously or individually, and display the UI or GUI.

As described above, if the display unit 151 and a touchpad are layered one top of another to construct a touchscreen, the display unit 151 may be used as an input device that can input information via user touch, in addition to being used as an output device.

If the display unit 151 is a touchscreen, the display unit 151 may include a touchscreen panel, a touchscreen panel controller, and the like. In this case, the touchscreen panel is an externally attached transparent panel, and may be connected to an internal bus of the mobile terminal 100. The touchscreen panel monitors contact results, and sends corresponding signals, which indicate occurrence of touch input, to a touchscreen panel controller. The touchscreen panel controller may process the signals and transmit data corresponding to the signals to the processor 180, thereby allowing the processor 180 to determine whether or not touch input occurs or which area of a touchscreen is touched.

The display unit 151 may be configured as e-Paper. In addition, the display unit 151 may include at least one of a liquid crystal display, a thin film transistor liquid crystal display, an organic light emitting diode, a flexible display, and a 3D display. According to a configuration of the mobile terminal 100, two or more display units 151 may be provided. For example, the mobile terminal 100 may include both an external display unit (not shown) and an internal display unit (not shown).

The sound output module 153 may output audio data received from the wireless communication unit 100, or stored in the memory unit 160, in a call signal reception mode, a call mode, a recording mode, a voice recognition mode, a broadcast receiving mode, and the like. In addition, the sound output module 153 outputs audio signals related to functions that are being implemented by the mobile terminal 100, for example, call signal reception sound, message reception sound, and the like. The sound output module 153 may include a speaker and a buzzer, for example.

The alarm unit 155 is adapted to output a signal that indicates occurrence of an event in the mobile terminal 100. Examples of the event occurring in the mobile terminal 100 include call signal reception, message reception, key signal input, and the like. The alarm unit 155 outputs the signal to indicate occurrence of the event as an audio signal, a video signal, or other forms of signals. For example, the alarm unit 155 may output a signal in the form of vibration. If a call signal or a message is received, the alarm unit 155 may output a signal to indicate reception of the call signal or the message. In addition, if a key signal is input, the alarm unit 155 may output a feedback signal in response to input of the key signal. The user may recognize occurrence of an event based on the signal output by the alarm unit 155. The signal to indicate occurrence of an event in the mobile terminal 100 may also be output by the display unit 151 or the sound output module 153.

The haptic module 157 is adapted to generate various haptic effects that the user can sense. Vibration is a representative example of a haptic effect generated by the haptic module 157. If the haptic module 157 generates vibration as a haptic effect, the haptic module 157 may change, for example, the intensity and pattern of vibration being generated, and may combine and output different types of vibrations or sequentially output the vibrations.

In addition to the vibration, the haptic module 157 may generate various other haptic effects, such as stimulation by a pin arrangement that vertically moves on the skin, stimulation by ejection or suction of air through an ejection port or suction port, stimulation by contact with the skin, stimulation by contact with an electrode, stimulation using electrostatic force, cold and warmth generated using an element that can absorb or radiate heat, and the like. The haptic module 157 may be configured to transmit a haptic effect via direct contact, and to sense a haptic effect via muscles of the user arm or finger. According to a configuration of the mobile terminal 100, two or more haptic modules 157 may be provided.

The memory unit 160 may store programs to assist processing and control of the processor 180, and may also function to temporarily store input or output data (for example, phonebooks, messages, still images, and moving images).

The memory unit 160 may include a storage medium of at least one type selected from among flash memory type, hard disk type, multimedia card micro type, and card type memory units (for example, an SD or XD memory unit), RAM, and ROM. In addition, the mobile terminal 100 may utilize a cloud storage that performs a storage function of the memory unit 150 over the Internet.

The interface unit 170 serves as an interface for use with all external appliances connected to the mobile terminal 100. Examples of the external appliances connected to the mobile terminal 100 include a wired/wireless headset, an external charger, a wired/wireless data port, a card socket, such as a memory card, a Subscriber Identification Module (SIM) card, and a User Identity Module (UIM) card, an audio Input/Output (I/O) terminal, a video I/O terminal, an earphone, and the like. The interface unit 170 may receive data or power from the aforementioned external appliances, and transmit the same to the respective components of the mobile terminal 100. In addition, the interface unit 170 may transmit internal data of the mobile terminal 100 to the external appliances.

When the mobile terminal 100 is connected to an external cradle, the interface unit 170 may serve as a passageway through which power is supplied from the connected cradle to the mobile terminal 100, or a passageway through which various instruction signals input via the cradle by the user are transmitted to the mobile terminal 100.

The processor 180 is typically adapted to control operation of the respective components, thereby controlling general operation of the mobile terminal 100. For example, the processor 180 performs control and processing related to a voice call, data communication, a video call, and the like. In addition, the processor 180 may include a multimedia reproduction module 181 to reproduce a multimedia program. The multimedia reproduction module 181 may be configured as hardware included in the processor 180, or may be configured as software separate from the processor 180. The processor 180 may include an application processor (not shown) for execution of applications. Alternatively, the application processor (not shown) may be provided separately from the processor 180.

The power supply unit 190 is adapted to receive external or internal power and to supply power required for operation of the respective components, under control of the processor 180.

The mobile terminal 100 having the above-described configuration includes a wired/wireless communication system and a satellite based communication system, and may be configured to be operable in a communication system that may transmit data as frames or packets.

FIG. 4 is a perspective view of the mobile terminal of FIG. 3 viewed from the front side, and FIG. 5 is a rear perspective view of the mobile terminal shown in FIG. 4. Hereinafter, the mobile terminal according to the present invention will be described in terms of components defining the external appearance of the mobile terminal with reference to FIGS. 4 and 5. In addition, for convenience of description, among various types of mobile terminals including flip type, bar type, swing type, and slider type mobile terminals, for example, a bar type mobile terminal equipped at a front surface thereof with a touchscreen will be described by way of example. However, it is noted that the present invention is not limited to the bar type mobile terminal, and may be applied to all types of mobile terminals including the aforementioned types.

Referring to FIG. 4, a case defining the external appearance of the mobile terminal 100 consists of a front case 100-1 and a rear case 100-2. A variety of electronics is embedded in a space confined by the front case 100-1 and the rear case 100-2.

A main body, more particularly, the front case 100-1 may be equipped with the display unit 151, a first sound output module 153a, the first camera module 200a, and first to third user input units 130a, 130b and 130c. In addition, a fourth user input unit 130d, a fifth user input unit 130e, and first to third microphones 123a, 123b and 123c may be arranged at a lateral surface of the rear case 100-2.

The display unit 151 overlaps with a touchpad in a layered manner. Thus, the display unit 151 may serve as a touchscreen to enable input of information by user touch.

The first sound output module 153a may be configured as a receiver or a speaker. The first camera module 200a may be configured to capture still images or moving images. The microphones 123a, 123b and 123c may be configured to receive user voice, other sounds, and the like.

The first to fifth user input units 130a, 130b, 130c, 130d and 130e as well as sixth and seventh user input units 130f and 130f that will be described hereinafter may be referred to collectively as the user input unit 130. All kinds of input means may be used so long as manipulation in a tactile manner is possible with provision of tactile sensation.

For example, the user input unit 130 may be configured as a dome switch, a touch pad or the like that can receive instructions or information via user push or touch manipulation, or may be configured as a jog wheel for rotation of a key, a joystick or the like. In terms of functions, the first to third user input units 130a, 130b and 130c are provided to input, for example, start, end and scroll instructions, and the fourth user input unit 130d is provided to input selection of an operation mode, for example. In addition, the fifth user input unit 130e may be operated as a hot key to activate a specified function of the mobile terminal 100.

The first and second microphones 123a and 123b may be arranged at the top of the rear case 100-2, i.e. at the top of the mobile terminal 100 to collect audio signals, and the third microphone 123c may be arranged at the bottom of the rear case 100-2, i.e. at the bottom of the mobile terminal 100 to collect audio signals.

Referring to FIG. 5, the second camera module 200b and the fourth microphone 123d may be additionally mounted at a rear surface of the rear case 100-2, and the sixth and seventh user input units 130f and 130g and the interface unit 170 may be arranged at the lateral surface of the rear case 100-2.

The second camera module 200b may be adapted to capture an image in substantially the opposite direction to that of the first camera module 200a. The first second camera module 200b and the first camera module 200a may have different numbers of pixels. A flash (not shown) and a mirror (not shown) may be additionally arranged proximate to the second camera module 200b. In addition, an additional camera may be installed proximate to the second camera module 200b and be used to assist acquisition of 3-dimensional images.

The flash is used to emit light toward a subject when the second camera module 200b captures an image of the subject. The user may view their face and the like when capturing (self-photographing) using the second camera module 200b.

The rear case 100-2 may be additionally equipped with a second sound output module (not shown). The second sound output module may realize a stereo function along with the first sound output module 153a, and may be used to place calls in a speakerphone mode.

The interface unit 170 may be used as a data exchange passageway with an external appliance. In addition, an antenna for call as well as a broadcast signal receiving antenna (not shown) may be arranged at the front case 100-1 and the rear case 100-2. These antennas may be pulled outward by the user.

The rear case 100-2 may be additionally equipped with the power supply unit 190 to supply power to the mobile terminal 100. The power supply unit 190 may be, for example, a rechargeable battery, and may be separably coupled to the rear case 100-2 for charging, and the like.

The fourth microphone 123d may be arranged at a front surface of the rear case 100-2, i.e. at a rear surface of the mobile terminal 100 to collect audio signals.

In the present embodiment, although the second camera module 200 has been described as being arranged at the rear case 100-2, the disclosure is not limited thereto. In addition, even if the second camera module 200b is not provided, the first camera module 200b may be rotatably configured to capture an image even in an image capture direction of the second camera module 200b.

The camera module having a single lens as described in this specification may be applied to both the first camera module 200a and the second camera module 200b of the drawings.

FIG. 6 is a block diagram illustrating an internal configuration of the camera module shown in FIG. 3.

Referring to FIG. 6, the camera module 200 may include an aperture 210, a single lens 220, an image sensor 230, and a lens drive unit 240.

Upon entering a camera mode, the processor 180 may control the lens drive unit 240, and in turn the lens drive unit 240 may shift a position of the lens 220. More particularly, the lens drive unit 240 may shift a position of the lens 220 upon entering a post focusing mode of the camera mode.

The lens drive unit 240 may include a drive circuit and an actuator to realize physical position shift of the lens 220.

The lens 220 may be sequentially shifted in position from the first end corresponding to a short distance to the second end corresponding to a long distance by the lens drive unit 240.

Upon entering a camera mode, the aperture 210 having a fixed size may be open. The camera module 200 according to the present invention includes the single lens 220, and thus the aperture 210 is opened to a predetermined size.

The image sensor 230 converts light introduced through the single lens 220 into an electric signal. More particularly, the image sensor 230 sequentially converts a light signal depending on a shifted position of the lens 220 into an electric signal as the lens 220 is shifted in position.

The processor 180 acquires an image on a per lens position basis using the electric signal from the image sensor 230. That is, the processor 180 may acquire an image having a predetermined resolution by processing the received electric signals.

The memory unit 160 stores the captured image on a per lens position basis acquired from the processor 180.

Although FIG. 6 shows the camera module 200 as not equipped with the processor, a separate processor may be provided to acquire an image on a per lens position basis using the electric signal from the image sensor 230. In addition, the camera module 200 may contain the memory unit 160 to store the captured image on a per lens position basis.

The user input unit 130 receives user input. For example, the user input unit 130 may receive touch input.

If the post focusing mode of the camera mode is selected via the user input unit 130, the processor 180 may control the lens drive unit 240, and in turn the lens drive unit 240 may shift a position of the lens 220.

FIG. 7 is a flowchart illustrating a method of operating an image display apparatus according to an embodiment of the present invention, and FIGS. 8 to 18 are reference views explaining various examples of a method of operating an image display apparatus of FIG. 7. The following description will focus on the mobile terminal as one example of the image display apparatus.

Referring to FIG. 7, the mobile terminal 100 enters a camera mode (S710). The mobile terminal 100 may enter the camera mode in response to user input via the user input unit 130. Thereby, the processor 180 may activate the camera module 200.

Next, the mobile terminal 100 shifts a position of the single lens provided in the camera module according to the camera mode, thereby acquiring an image captured on a per lens position basis (S715).

The processor 180 controls acquisition of an image using the camera module 200 having the single lens 220. More particularly, if the post focusing mode of the camera mode is selected, the processor 180 may control the lens drive unit 240 included in the camera module 200 to control position shift of the lens 220.

As the lens 220 is shifted in position, the image sensor 230 included in the camera module 200 may sequentially convert a light signal depending on a shifted position of the lens 220 into an electric signal. Thereby, the processor 180 may sequentially acquire images on a per lens position basis.

Next, the mobile terminal 100 stores the captured images acquired on a per lens position basis (S720). The processor 180 controls the memory unit 160 to store the sequentially acquired captured images on a per lens position basis. Thereby, the images acquired on a per lens position basis may be stored in the memory unit 160. In this case, the images acquired on a per lens position basis are images depending on the post focusing mode, and may be sorted and stored. To minimize storage consumption, the images acquired on a per lens position basis may be subjected to compression prior to storage.

Next, the mobile terminal 100 enters an image view mode (S725). Then, the mobile terminal 100 displays at least one of the plurality of captured images stored therein according to the image view mode (S730).

The processor 180 may enter an image view mode to display the captured images on the mobile terminal 100 via user manipulation.

Thereby, the processor 180 controls the display unit 151 to display at least some of the images stored in the memory unit 160.

In one example, the display unit 151 may display thumbnail images with regard to the captured images. Among the thumbnail images, some thumbnail images corresponding to the post focusing mode may be separately displayed from the other thumbnail images.

In another example, the display unit 151 may display the latest captured image among the captured images. Then, if image change is input, another captured image may be displayed on the display unit 151. Any one captured image corresponding to the post focusing mode among the captured images may be separately displayed.

Next, the mobile terminal 100 judges whether or not at least one area in the displayed image is selected (S735). If any one area is selected, the mobile terminal 100 displays a focused image of at least the selected area (S740).

The processor 180 may judge whether or not the captured image based on the post focusing mode is selected via user input. Then, the processor 180 may judge whether or not a specific area in the captured image based on the post focusing mode is selected. If the specific area is selected, the processor 180 may control display of an image that has focused on the selected area.

In one example, in a state in which a plurality of thumbnail images is displayed, if the user selects any one thumbnail image based on the post focusing mode, at least one of the plurality of captured images on a per lens position basis based on the post focusing mode may be displayed on the display unit 151. For example, an image depending on a first lens position, which has focused on a first area, may be displayed. In this case, if a second area in the image depending on the first lens position is selected via user input, an image depending on a second lens position, which has focused on the second area, may be displayed.

In another example, any one image among the plurality of captured images based on the post focusing mode may be displayed on the display unit 151 without display of a plurality of thumbnail images. For example, an image depending on a first lens position, which has focused on a first area, may be displayed. In this case, if a second area of the image depending on the first lens position is selected via user input, an image depending on a second lens position, which has focused on the second area, may be displayed.

Thereby, in the post focusing mode, any one image among the captured images, which has focused on an area selected by the user, may be displayed in a simplified manner.

FIG. 8 illustrates image capture based on a camera mode.

As exemplarily shown in FIG. 8(*a*), a camera mode screen 810 is displayed when a camera mode item is selected via user input. In this case, the camera mode item may include a sequential image capture mode item and a post focusing mode item.

If the camera mode screen 810 is selected, as exemplarily shown in FIG. 8(*b*), a post focusing mode screen is displayed by way of example, although various alternatives are possible.

More specifically, a post focusing mode item, a sequential image capture mode item, a close-up mode item, and the like may be displayed in the camera mode screen 810 of FIG.

8(*a*). If the post focusing mode item is selected from among these items, the mobile terminal 100 may enter a post focusing mode.

Once the post focusing mode has been selected, the processor 180 may control the lens drive unit 240 included in the camera module 200 so as to control position shift of the lens 220. Thereby, the processor 180 may sequentially acquire images on a per lens position basis via the camera module 200.

As exemplarily shown in FIG. 8(*c*), a thumbnail list 524 is displayed, which includes thumbnail images with regard to the sequentially acquired captured images on a per lens position basis.

The thumbnail list 524 may include a first thumbnail image 524*a* corresponding to a first lens position, a second thumbnail image 524*b* corresponding to a second lens position, and an nth thumbnail image 524*n* corresponding to an nth lens position.

The first thumbnail image 524*a* is a thumbnail image with regard to the first captured image 525*a*, which corresponds to the first lens position and is acquired at a first time ta, and the second thumbnail image 524*b* is a thumbnail image with regard to the second captured image 525*b*, which corresponds to the second lens position and is acquired at a second time tb. In addition, the nth thumbnail image 524*n* is a thumbnail image with regard to the nth captured image 525*n*, which corresponds to the nth lens position and is acquired at an nth time tn.

FIG. 9 is a view showing various examples of a method of moving a lens in the post focusing mode.

If the post focusing mode is executed, preferably, the processor 180 sequentially moves the lens 220 from a first end to a second end.

As exemplarily shown in FIG. 9(*a*), if the lens 220 is located at a first end P1, the lens 200 may be sequentially moved toward a second end P2 along a first path Path1. Then, during sequential movement of the lens 220 along the first path Path1, the processor 180 may acquire captured images via the camera module 200.

If the lens 220 is not located at the first end P1 upon executing the post focusing mode, preferably, the lens 220 is moved to the first end P1.

In one example, as exemplarily shown in FIG. 9(*b*), if the lens 220 is located at a predetermined position Px in place of the first end P1, the lens 220 may be moved to the first end P1 along a second path Path2, and thereafter be moved from the first end P1 to the second end P2 along a third path Path3. In this case, acquisition of the captured images may be implemented while the lens 220 is being moved along the third path Path3 rather than being moved along the second path Path2.

In another example, as exemplarily shown in FIG. 9(*c*), the lens 220 may capture an image while being moved along the second path Path2, but cease image capture while being moved from the first end P1 to the predetermined position Px along a fourth path Path4. Then, the lens 220 may again capture an image while being moved from the predetermined position Px to the second end P2 along a fifth path Path5.

In conclusion, the lens 220 may need to be moved at least from the first end P1 to the second end P2. In this case, it is preferable to acquire a captured image on a per lens position basis. A first captured image is an image corresponding to the first end P1, i.e. a first lens position. The first captured image may correspond to a captured image that has focused upon a short distance. An nth captured image is an image corresponding to the second end P2, i.e. an nth lens position. The nth captured image may correspond to a captured image that has focused upon a long distance.

Although FIG. 9 illustrates that the lens 220, which is located between the first end P1 and the second end P2, is moved to the first end P1, the disclosure is not limited thereto, and the lens 220 may be moved to one of the first end P1 and the second end P2 that is located closer thereto than the other. Thereafter, sequential movement of the lens 220 in an opposite direction may be possible.

FIG. 10 is a reference view explaining image storage operation S720 of FIG. 7, and FIG. 11 is a reference view explaining an image storage method of FIG. 10.

Referring to FIG. 10, the mobile terminal 100 may generate tag information (S1010). The tag information includes at least one of number information, size information, position information, start marker, and end marker with regard to a sequentially acquired captured images on a per lens position basis or all of a plurality of captured images on a per lens position basis.

More particularly, the processor 180 may generate a tag buffer for generation of tag information. Then, the processor 180 may store information regarding the number of images to be packaged and the start marker in the tag buffer. In addition, the processor 180 may store information regarding the size and position of each image among the sequentially acquired captured images on a per lens position basis, in the tag buffer. Storage of information regarding the size and position of each image is sequentially implemented until information regarding the final image is stored. After storage of information regarding the size and position of the final image is completed, the processor 180 may store the end marker in the tag buffer. In this way, tag information including a variety of information stored in the tag buffer is generated.

Next, the mobile terminal 100 compresses the acquired captured images on a per lens position basis (S1015).

As exemplarily shown in FIG. 11, for efficient storage, the processor 180 may compress each of the images 525*a*, . . . , 525*n* acquired on a per lens position basis. FIG. 11 illustrates small compressed images 526*a*, . . . , 526*n* corresponding to the captured images 525*a*, . . . , 525*n* on a per lens position basis.

Although FIG. 11 illustrates image compression on a per image basis, alternatively, image compression may be implemented using differential data based on a difference between the respective images.

Next, the mobile terminal 100 implements packing of the plurality of captured images on a per lens position basis and the generated tag information (S1020). Then, the mobile terminal 100 stores an archive file in the memory unit 160 (S1025).

To implement packing, the processor 180 adds the tag information, generated in operation S1010, to the compressed images 526*a*, . . . , 526*n*. Thereby, an archive file 1120 depending on the post focusing mode is generated. The archive file 1120 may be sorted and stored in the memory unit 160.

FIGS. 12 to 17 show various methods of displaying a focused image in an image view mode.

First, referring to FIG. 12, as exemplarily shown in FIG. 12(*a*), if a gallery item 1210 for entry into an image view mode is selected in a state in which an app screen 1200 is displayed on the mobile terminal 100, the mobile terminal 100 enters an image view mode. Thereby, as exemplarily shown in FIG. 12(*b*), a thumbnail list 1220 including a plurality of thumbnail images corresponding to the captured images may be displayed.

In this case, as exemplarily shown, a thumbnail image 1230 corresponding to any one captured image based on the post focusing mode may be displayed in a highlighted manner for differentiation with the other thumbnail images. Although the drawing illustrates that an indicator 1235 representing the post focusing mode is displayed as overlapping the corresponding thumbnail image 1230, various other examples are possible.

If the user selects the thumbnail image 1230 corresponding to the captured image based on the post focusing mode, as exemplarily shown in FIG. 12(c), any one image 525n among the plurality of captured images 525a, . . . , 525n based on the post focusing mode may be displayed.

As described above, assuming that the number of images based on the post focusing mode is n, any one image among n images may be displayed. The drawing illustrates display of the latest captured image, i.e. the nth captured image 525n. The nth captured image 525n is an image captured when the lens 220 is located at the second end P2. That is, the nth captured image 525n may be an image acquired via long distance focusing.

Accordingly, it will be appreciated from the drawing that person(s) who are at the longest distance among a plurality of persons in an image are focused and displayed. Thus, a long distance area in the nth captured image 525n exhibits the highest definition and edge sharpness.

An indicator 1245 representing the post focusing mode may further be displayed in the displayed nth captured image 525n.

If the user touches a short distance area 527 using their finger 52, as exemplarily shown in FIG. 12(d), the first captured image 525a among the plurality of captured images 525a, . . . , 525n, which is acquired via short distance focusing, may be displayed.

Accordingly, it will be appreciated from the drawing that a person who is at the shortest distance among a plurality of persons included in the image is focused and displayed. Thus, a short distance area in the first captured image 525a exhibits the highest definition and edge sharpness.

An indicator 1255 representing the post focusing mode may further be displayed in the displayed first captured image 525a.

To display a focused image among the plurality of captured images 525a, . . . , 525n based on the post focusing mode via user selection, the processor 180 may calculate coordinate information corresponding to a selected area, extract tag information from the above-mentioned archive file 1120, and acquire captured images on a per lens position basis based on the tag information. In this case, after decoding the corresponding area with regard to the respective images based on the calculated coordinate information, any one image among the plurality of images, which has the highest definition or the most data in the decoded area, is selected. Then, decoding of the entire selected captured image may be implemented, and the resulting image may be displayed on the display unit 151 under control.

Upon calculation of the image having the highest definition, the processor 180 may calculate the captured image having the highest definition based on edge information related to the corresponding area. That is, an image having the highest edge level may be calculated.

Although FIG. 13 is similar to FIG. 12, if the thumbnail image 1230 corresponding to a captured image based on the post focusing mode is selected from the thumbnail list 1220 as exemplarily shown in FIG. 13(b), a plurality of captured images may be displayed as exemplarily shown in FIG. 13(c), differently from FIG. 12(c) in which any one captured image is displayed. For example, if user touch for selection of the thumbnail image 1230 in FIG. 13(b) is long touch (or long tap input), this user touch is different from that of FIG. 12(b), and a plurality of captured images may be displayed as exemplarily shown in FIG. 13(c).

FIG. 13(c) illustrates that thumbnail images 1325a, 1325b, . . . , 1325n representing a plurality of captured images are aligned and displayed. Although FIG. 13(c) illustrates that all thumbnail images 1325a, 1325b, . . . , 1325n corresponding to the first to nth captured images 525a, . . . , 525n are displayed, only some of the images may be displayed. Moreover, each of the thumbnail images 1325a, 1325b, . . . , 1325n may include an indicator that represents the post focusing mode.

If the user selects the first thumbnail image 1325a using their finger 52, as exemplarily shown in FIG. 13(d), the first captured image 525a, acquired via short distance focusing, may be displayed.

Differently from FIG. 13(d), a plurality of captured images may be aligned and displayed on the basis of the first captured image 525a corresponding to the selected first thumbnail image 1325a. In this case, the plurality of captured images may be displayed in an overlapping state. Preferably, the first captured image 525a is the uppermost image.

Next, as exemplarily shown in FIG. 14, if user selection for an area is input in a state in which any one captured image based on the post focusing mode is displayed, any one captured image, focused on the corresponding area, may be displayed.

FIG. 14(a) illustrates that the second captured image 525b, which has focused on a second area, is displayed on the display unit 151 of the mobile terminal 100. In this case, a thumbnail list 1520 including a thumbnail image corresponding to the second captured image 525b and a scroll bar 1530 may be displayed below the second captured image 525b. In particular, the thumbnail image corresponding to the second captured image 525b may be displayed in a highlighted manner.

In this case, if a long distance area 1527 in the second captured image 525b is selected via user input as exemplarily shown in FIG. 14(a), the nth captured image 525a acquired via long distance focusing is displayed on the display unit 151 of the mobile terminal 100 as exemplarily shown in FIG. 14(b). In this case, the thumbnail list 1520 including a thumbnail image corresponding to the nth captured image 525n and the scroll bar 1530 may be displayed below the nth captured image 525n. In particular, the thumbnail image corresponding to the nth captured image 525n may be displayed in a highlighted manner.

Then, repeatedly, if a short distance area in the nth captured image 525n is selected via user input, the first captured image 525a acquired via short distance focusing is displayed on the display unit 151 of the mobile terminal 100 as exemplarily shown in FIG. 14(c). In this case, the thumbnail list 1520 including a thumbnail image corresponding to the first captured image 525a and the scroll bar 1530 may be displayed below the first captured image 525a. In particular, the thumbnail image corresponding to the first captured image 525a may be displayed in a highlighted manner.

In this way, if a specific area is selected via user input in a state in which the captured image based on the post focusing mode is displayed, a captured image, which has focused on the corresponding area, is displayed in a simplified manner.

As exemplarily shown in FIG. 15, if a plurality of captured images is selected from among captured images based on the post focusing mode, a final composite image, acquired by composing respective focused areas in the plurality of captured images, is displayed.

FIG. 15(a) illustrates that thumbnail images 1325a, 1325b, . . . , 1325n representing a plurality of captured images based on the post focusing mode are aligned and displayed.

In this case, if several thumbnail images 1325a, 1325b and 1325n, among the thumbnail images 1325a, 1325b, . . . , 1325n representing the plurality of captured images, are selected via multiple user touches or sequential touch input, respective focused areas in the selected captured images are composed to enable display of a composite image 1429 as exemplarily shown in FIG. 15(b). Thereby, a focused image that the user wishes to acquire may be displayed in a simplified manner.

In addition, FIG. 15(a) illustrates that the composite image 1429, focused on the plurality of areas, includes an indicator representing the post focusing mode.

Even when a plurality of areas in the captured image is selected via multiple user touches or sequential touch input in a state in which any one captured image among the plurality of captured images is displayed as exemplarily shown in FIG. 14(a), as exemplarily shown in FIG. 15(b), the composite image 1429, focused on all of the selected areas, may be displayed.

Meanwhile, if a predetermined number of areas is selected, a composite image, focused on all of the selected areas, may be displayed.

For image composition, the processor 180 may select a corresponding area in any one image among the plurality of captured images, which has the highest definition or the most data in the selected area, and then select a corresponding area in each image, which has the highest definition or the most data in another area except for the selected area, on the basis of the selected image, thereby acquiring a single composite image using the selected areas.

FIG. 16 is a reference view explaining image composition.

Referring to FIG. 16, a composite image 525a is generated via composition of the first captured image to the nth captured image 525a, . . . , 525n. In this case, image composition may be implemented using respective focused areas in the first captured image to the nth captured image 525a, . . . , 525n.

The processor 180 may calculate high definition areas corresponding to focusing areas by performing edge detection on respective captured images based on the post focusing mode. In addition, the processor 180 may detect depths of the respective high definition areas. Then, the processor 180 may generate a depth image including depth information regarding the respective areas in the captured images using the depths of the respective areas.

FIG. 17 illustrates generation of a depth image with regard to captured images.

A plurality of captured images 1725a, 1725b, 1725c and 1725d include focusing areas 1726a, 1726b, 1726c and 1726d respectively. The processor 180 may calculate high definition areas 1735a, 1735b, 1735c and 1735d corresponding to the focusing areas 1726a, 1726b, 1726c and 1726d by performing edge detection on the respective captured images 1725a, 1725b, 1725c and 1725d. In addition, the processor 180 may detect depths 1745a, 1745b, 1745c and 1745d of the high definition areas 1735a, 1735b, 1735c and 1735d.

Then, the processor 180 may generate a depth image 1750 including information regarding the depths 1745a, 1745b, 1745c and 1745d of the respective high definition areas 1735a, 1735b, 1735c and 1735d in the respective captured images 1725a, 1725b, 1725c and 1725d using the depths 1745a, 1745b, 1745c and 1745d.

In conclusion, the depth image is similar to a composite image of the focusing areas as described above with reference to FIG. 16.

FIG. 18 is a reference view explaining focused image display operation S740 of FIG. 7.

Referring to FIG. 18, if at least one area in a displayed captured image is selected, the mobile terminal 100 acquires coordinate information on the selected area (S1810).

The processor 180 may calculate coordinate information on the corresponding area based on change of an electric signal due to touch input if a specific area of the display unit 151 receives touch input.

In this case, the processor 180 may calculate the coordinate information based on touch input in different ways according to whether the mobile terminal 100 is displaying an image in a horizontal mode or in a vertical mode.

In addition, the processor 180 may calculate the coordinate information based on touch input in different ways according to whether the displayed captured image is a zoom-in image or a zoom-out image.

Next, the mobile terminal 100 extracts tag information from the archive file stored in the memory unit 160 (S1815). Then, the mobile terminal 100 acquires a plurality of captured images on a per lens position basis based on the extracted tag information (S1820).

To calculate focused images based on the coordinate information based on touch input, the processor 180 may read out the archive file (1120 of FIG. 11) stored in the memory unit 160, and extract tag information (1110 of FIG. 11) included in the archive file.

Next, the processor 180 may acquire number information, size information, position information, start marker, end marker, and the like with regard to a sequentially acquired captured images on a per lens position basis or all of a plurality of captured images on a per lens position basis.

Then, the processor 180 may extract compressed images (526a, . . . , 526n of FIG. 11) from the archive file stored in the memory unit 160 using a variety of information included in the tag information.

Next, the mobile terminal 100 decodes corresponding areas in the respective images based on the calculated coordinate information (S1825). Then, the mobile terminal 100 calculates any one captured image, which has the highest definition in the decoded area (S1830). Then, the mobile terminal 100 displays the calculated captured image.

The processor 180 decodes the compressed images (526a, . . . , 526n of FIG. 11). In particular, based on the calculated coordinate information, the processor 180 may decode only an area corresponding to the coordinate information in the compressed image. This may reduce decoding time.

The processor 180 may implement, for example, edge detection on the respective decoded areas, and calculate any one captured image having the highest definition.

For example, if the long distance area 1527 in the captured image 525b is selected via user touch input as exemplarily shown in FIG. 14(a), as exemplarily shown in FIG. 14(b), the nth captured image 525n, acquired via long distance focusing, among the plurality of captured images may be calculated and displayed on the display unit 151 of the mobile terminal 100. In this way, the focused captured image may be displayed in a simplified manner.

The image display apparatus and the method of operating the same according to the present invention are not limited to the above described configurations and methods, and all or some of the above embodiments may be selectively combined to achieve various modifications.

The image display apparatus and the method of operating the same according to the present invention may be implemented as processor readable code that can be written on a processor readable recording medium included in the image display apparatus. The processor readable recording medium may be any type of recording device in which data is stored in a processor readable manner. Examples of the processor readable recording medium include a ROM, a RAM, a CD-ROM, a magnetic tape, a floppy disc, an optical data storage device, and the like. In addition, the processor readable recording medium may be a carrier wave (e.g., data transmission over the Internet). The processor readable recording medium can be distributed over a plurality of computer systems connected to a network so that processor readable code is written thereto and executed therefrom in a decentralized manner.

As is apparent from the above description, according to an embodiment of the present invention, a single lens included in a camera module is shifted in position according to a camera mode to acquire and store a captured image on a per lens position basis. If at least one of a plurality of stored captured images is displayed according to an image view mode and at least one area in the displayed captured image is selected, an image, focused on at least the selected area, is displayed. In this way, an image display apparatus equipped with the camera module having the single lens may function to regulate focusing, which may result in enhanced user convenience.

In particular, display of the focused image may be implemented via calculation of any one captured image that has the highest definition in the selected area. This ensures display of the focused image in a simplified manner.

Based on an image view mode, a thumbnail list including thumbnail images corresponding to the stored images may be displayed, and any one thumbnail image corresponding to the focused image may be displayed in a highlighted manner. This may further enhance user convenience.

In addition, if any one image is selected in a state in which the plurality of stored images is displayed, the plurality of images may be aligned and displayed on the basis of the selected image, or only the selected image may be displayed, which may result in enhanced user convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of operating an image display apparatus, the method comprising:
    entering a camera mode;
    acquiring a captured image on a per lens position basis via a position shift of a single lens included in a camera module according to the camera mode;
    storing the acquired captured image on the per lens position basis;
    displaying at least one of a plurality of stored captured images according to an image view mode; and
    displaying any one image focused on at least one area in the displayed captured image when the at least one area is selected,
    wherein display of the focused image includes:
    selecting a corresponding area in any one captured image among the plurality of stored images, which has a highest definition or a most data in a selected area when at least one area in the displayed captured image is selected; and
    selecting a corresponding area in each image, which has the highest definition or the most data in another area except for the selected area, on the basis of the selected captured image;
    acquiring a single composite image using the selected corresponding areas; and
    displaying the composite image.

2. The method according to claim 1, wherein display of the focused image includes:
    acquiring coordinate information on at least one area in the displayed captured image when the at least one area is selected;
    decoding an area corresponding to the coordinate information with respect to each of the plurality of stored captured images;
    calculating any one captured image having the highest definition based on an edge detection for the respective decoded areas corresponding to the coordinate information; and
    displaying the calculated captured image.

3. The method according to claim 1, wherein storage of the image includes:
    generating tag information, wherein the tag information includes at least one of number information, size information, position information, start marker, and end marker with respect to the sequentially acquired captured images on the per lens position basis or all of the plurality of captured images on the per lens position basis; and
    packing the generated tag information and the plurality of captured images on the per lens position basis.

4. The method according to claim 1, wherein display of the focused image includes:
    extracting tag information from an archive file when at least one area in the displayed captured image is selected;
    acquiring the plurality of captured images on the per lens position basis based on the extracted tag information;
    calculating any one captured image having the highest definition based on an edge detection for respective areas, corresponding to the selected area, in the plurality of captured images on the per lens position basis; and
    displaying the calculated captured image.

5. The method according to claim 1, further comprising displaying a thumbnail list including a thumbnail image corresponding to the stored image according to the image view mode,
    wherein any one thumbnail image of the thumbnail list, associated with the stored image among the plurality of images on the per lens position basis based on the camera mode, is displayed in a highlighted manner.

6. The method according to claim 1, wherein display of the focused image includes:
    selecting any one captured image among the plurality of stored images, which has the highest definition, the highest edge sharpness, and/or the most data in a selected area when at least one area in the displayed captured image is selected; and displaying the selected image.

7. The method according to claim 1, wherein display of the focused image includes:

selecting any one captured image among the plurality of stored images, which has the highest definition or the most data in a selected area when at least one area in the displayed captured image is selected; and aligning and displaying the plurality of images on the basis of the selected image.

8. The method according to claim 1, further comprising displaying the plurality of images in response to input for display of the plurality of stored captured images, wherein display of the focused image includes, when any one image among the plurality of displayed images is selected, aligning and displaying the plurality of images on the basis of the selected image.

9. The method according to claim 1, further comprising displaying the plurality of images in response to an input for display of the plurality of stored captured images, wherein display of the focused image includes, when any one image among the plurality of displayed images is selected, displaying the selected image.

10. An image display apparatus comprising:

a camera module including a single lens, an image sensor to convert a light signal introduced through the single lens into an electric signal, and a lens driver to shift a position of the single lens for regulation of a focal distance;

a processor to acquire a captured image on a per lens position basis via position shift of the single lens included in the camera module according to a camera mode;

a memory to store the acquired captured image on a per lens position basis; and a display to display at least one of a plurality of stored captured images according to an image view mode and to display any one image focused on the at least one area in the displayed captured image when the at least one area is selected, wherein the processor selects a corresponding area in any one captured image among the plurality of captured images, which has a highest definition or a most data in a selected area when at least one area in the displayed captured image is selected, selects a corresponding area in each image, which has the highest definition or the most data in another area except for the selected area, on the basis of the selected captured image, and acquires a single composite image using the selected corresponding area.

11. The image display apparatus according to claim 10, wherein the camera module further includes an aperture that is opened to a predetermined value in the camera mode.

12. The image display apparatus according to claim 10, wherein the processor acquires coordinate information on at least one area in the displayed captured image when the at least one area is selected, decodes an area corresponding to the coordinate information with respect to each of the plurality of stored captured images, and calculates any one captured image having the highest definition based on edge detection for the respective decoded areas corresponding to the coordinate information.

13. The image display apparatus according to claim 10, wherein the processor generates tag information including at least one of number information, size information, position information, start marker, and end marker with respect to the sequentially acquired captured images on the per lens position basis or all of the plurality of captured images on the per lens position basis, and generates an archive file via packing of the generated tag information and the plurality of captured images on the per lens position basis.

14. The image display apparatus according to claim 10, wherein the processor extracts tag information in an archive file when at least one area in the displayed captured image is selected, acquires the plurality of captured images on the per lens position basis based on the extracted tag information, and calculates any one captured image having the highest definition based on an edge detection for respective areas, corresponding to the selected area, in the plurality of captured images on the per lens position basis.

15. An image display apparatus comprising:

a camera module including a single lens, an image sensor to convert a light signal introduced through the single lens into an electric signal, and a lens driver to shift a position of the single lens for regulation of a focal distance;

a processor to acquire a captured image on a per lens position basis via a position shift of the single lens included in the camera module according to a camera mode;

a memory to store the acquired captured image on the per lens position basis; and a display to display at least one of a plurality of stored captured images according to an image view mode and to display any one image focused on the at least one area in the displayed captured image when the at least one area is selected, wherein the display displays a thumbnail list including a thumbnail image corresponding to the stored image according to the image view mode, and displays any one thumbnail image of the thumbnail list, associated with the stored image among the plurality of images on the per lens position basis based on the camera mode, in a highlighted manner.

* * * * *